ated Dec. 5, 1967

3,356,625
GASKET-FORMING PLASTISOLS COMPRISING VINYL CHLORIDE RESIN, EPOXY PLASTICIZER, DIESTER PLASTICIZER AND FILLER
Donald A. Giessler, Center Township, Ind., assignor to Ball Brothers Company, Inc., Muncie, Ind., a corporation of Indiana
No Drawing. Continuation of application Ser. No. 277,690, May 3, 1963, which is a continuation of application Ser. No. 197,848, May 28, 1962. This application July 11, 1966, Ser. No. 564,432
7 Claims. (Cl. 260—23)

ABSTRACT OF THE DISCLOSURE

A polyvinyl chloride plastisol gasket-forming composition having unusually high filler ratios with workable viscosities as a result of the use of a critical plasticizer composition including an epoxidized unsaturated natural oil and a dialkyl diester of sebacate acid, adipic acid, and azelaic acid, and a closure employing such a gasket-forming plastisol composition.

This application is a continuation of application Ser. No. 277,690, filed May 3, 1963, which application is in turn a continuation of application Ser. No. 197,848, filed May 28, 1962, both said applications now being abandoned.

This invention relates to a gasket composition and, more particularly, to a vinyl plastisol composition which is particularly useful in forming a gasket in a closure for a glass jar or the like.

Vinyl plastisols have found relatively wide usage in providing gaskets for closures for glass jars and the like. They can be introduced into an enameled closure, in the region where a seal between the finish of a jar or the like and the closure is desired, heated for a very short period of time, e.g. three minutes or less, and then cooled to provide a completed gasket. Certain problems have been encountered, however, with respect to compositions which are safe for use in packaging foods. Only a relatively few plasticizers are acceptable in plastisols which may come into contact with food, and such plasticizers have only limited variations in properties and effect. Certon plasticizers which are acceptable for all other reasons are less acceptable due to the taste and/or odor characteristics they introduce. As a consequence, it has heretofore been necessary to control the plastisol composition within relatively narrow limits in order to achieve a commercially workable composition. For example, only a relatively small proportion of a filler can be incorporated in the compositions and still retain a workable viscosity.

The instant invention is based upon the discovery of a particular plastisol composition wherein a significantly higher proportion of filler can be employed than was heretofore possible. The invention is also based upon the discovery that the viscosity of the plastisol composition, and, therefore, the amount of filler that can be employed therewith, can be varied by changes in the relative proportions of the constituents of the composition.

It is, therefore, an object of the invention to provide a new and improved plastisol composition.

It is a further object of the invention to provide a novel plastisol composition that is particularly useful in producing gaskets in closures for glass jars and the like.

It is another object of the invention to provide an improved plastisol composition which is of such a nature that seal impressions are readily made by the glass finish in contact with the gasket with or without the aid of heating the cap prior to application on the jar.

Other objects and advantages will be apparent from the description which follows, which is intended only to illustrate and disclose, and in no way to limit, the invention.

The gasket composition of the invention generally comprises a plastisol mixture comprising a vinyl polymer composition, a filler and a combination of plasticizers. The plasticizer combination, advantageously, includes an epoxide plasticizer and a diester plasticizer.

The epoxide plasticizers may be epoxidized unsaturated organic compounds such as olefins, and particularly olefins having isolated double bonds or double bonds near alkyl groups, e.g., fats, oils, esters, etc. Advantageously, the epoxide plasticizers are epoxidized oils such as soybean oil, linseed oil, safflower oil, and the like. Preferably, the epoxides have an iodine number not greater than 6 and an oxirane oxygen of at least 6 percent.

The diester plasticizers employed in combination with the epoxide may be diesters of dibasic acids such as sebacic acid, adipic acid, azelaic acid, and the like, with the sebacates being preferred. Particularly useful as diester plasticizers in the gasket composition of the invention are diesters of sebacic acid with $C_4$ to $C_8$ alkyl alcohols, diesters of azelaic acid with $C_4$ to $C_8$ alkyl alcohols, and diesters of adipic acid with $C_4$ to $C_{16}$ alkyl alcohols and mixtures thereof.

The vinyl polymer composition of the plastisol gasket composition according to the invention advantageously is formed by emulsion or suspension polymerization techniques, and then spray dried. The emulsion polymerization produces dense spherical particles having a diameter of the order of about 1–2 microns, while the suspension polymerization produces larger, e.g. about 10 microns, particles which are otherwise similar. The particles are easily dispersible in plasticizers, but not dissolved thereby until the temperature is raised to about 300–400° F. In commercial practice they are most often polyvinyl chlorides or copolymers of vinyl chloride, for example with vinyl acetate or vinylidene chloride, although other dispersible vinyl polymers, copolymers or mixtures can also be used. Copolymers are more likely to be produced by suspension polymerization, and homopolymers by emulsion polymerization.

As has been indicated above, the composition according to the invention includes a filler such as calcium carbonate or barium sulfate. Barium sulfate is the preferred filler because it is substantially completely inert under conditions to which a gasket for a glass jar or the like containing food is ordinarily subjected in use. Calcium carbonate, on the other hand, is reactive with acidic foods, evolving carbon dioxide which can develop a superatmospheric pressure under certain conditions. However, calcium carbonate is entirely satisfactory for use in a gasket composition which does not come into contact with acidic foods in service. Other fillers can also be used but at a sacrifice to optimum plastisol viscosity at normal room temperature.

Operable, preferred and optimum ranges of proportions of ingredients in the plastisol gasket composition according ot the invention are within the approximate ranges set forth in Table I, below:

TABLE I

| | Parts | | |
|---|---|---|---|
| | Operable | Preferred | Optimum |
| Vinyl polymer composition | 100 | 100 | 100 |
| Plasticizer composition | 150–300 | 190–240 | About 215 |
| Filler equivalent on a volume basis to the indicated number of parts of barium sulfate | 150–450 | 275–325 | About 300 |

N.b.: Where calcium carbonate is employed, the operable range is about 97–293 parts; the preferred range is about 179–211 parts; and the optimum proportion is about 195 parts.

Operable, preferred and optimum proportions of the diester plasticizer and the epoxide plasticizer in the composition according to the invention are within the approximate ranges set forth in Table II, below:

TABLE II

|  | Parts | | |
| --- | --- | --- | --- |
|  | Operable | Preferred | Optimum |
| Diester | 25–100 | 40–60 | 50 |
| Epoxide | 100–200 | 150–180 | 165 |

Compositions according to the invention may contain additional ingredients such as lubricants, stabilizers or the like, which have been employed in previously known plastisol gasket compositions provided such ingredients do not adversely affect the unexpected cooperation among the several constituents which have been discussed above.

The following examples are presented solely for the purpose of further illustrating and disclosing the invention, and are in no way to be construed as limitations thereon.

Example 1

The following procedure was used to produce a plastisol gasket composition from a dispersible vinyl chloride resin,[1] a dispersible vinyl chloride-vinylidene chloride copolymer resin,[2] dibutyl sebacate, an epoxidized soybean oil,[3] barium sufate,[4] and other ingredients for pigmentation, lubrication, and stabilization.

A high speed mixer was used to produce a plastisol from 58 parts of the polyvinyl chloride resin, 42 parts of the vinyl chloride-vinylidene chloride copolymer resin, 165 parts of the epoxidized soybean oil, 50 parts of dibutyl sebacate and 300 parts of the barium sulfate, plus pigments, lubricants and stabilizers. Mixing was continued until a uniform dispersion had been produced. This dispersion had a viscosity of 3000 centipoises at room temperature, and was suited for use in producing gaskets in closures by commercial techniques at room temperature and at elevated temperatures.

---

[1] The dispersible vinyl chloride resin had an average particle size of about 1 to 2 microns, 100 percent thereof being finer than 200 mesh, U.S. Sieve series, and was of relatively high molecular weight, a 60 percent solution thereof in a blended alcohol phthalate (an average of 8 carbon atoms in the alcohol) plasticizer having a viscosity of about 4000 centipoises. The specific viscosity of the resin was about 0.6.
[2] The dispersible vinyl chloride-vinylidene chloride copolymer resin had an average particle size of about 10 microns, and was of a medium to low molecular weight, having a specific gravity of about 0.4.
[3] The epoxidized soybean oil had an iodine number of 0.7 and an oxirane oxygen of 6.8 percent.
[4] The barium sulfate was a fine powder, substantially all of the particles of which were smaller than 12½ microns; it had a specific gravity of 4.40 and an oil absorption rating of 9.2.

Satisfactory plastisols have also been produced by the same method and from substantially the same ingredients, except that different epoxidized soybean oil plasticizers were used. These plasticizers varied in iodine number from 0.6 to 0.9, and in oxirane oxygen from 6.3 percent to 7.0 percent.

Similar results have also been achieved using 428 parts of the barium sulfate filler instead of the 300 parts, and using 428 parts of the barium sulfate filler and 115 parts and 190 parts of the epoxidized soybean oil plasticizer with 100 parts and 25 parts, respectively, of dibutyl sebacate. Similarly, 100 parts of the vinyl chloride resin have been used in the foregoing procedure in place of the mixture of vinyl chloride and copolymer resins.

The dispersion according to the invention produced as described in Example 1, above, was used to form a gasket in a closure for a glass jar by injecting about a 1600 milligram portion thereof into a groove near the periphery of the closure, and heating the closure and the dispersion to a temperature of approximately 350° F. for about two minutes.

Example 2

The procedure described in Example 1, above, has also been employed to produce other plastisol dispersion gasket compositions according to the invention. Representative formulations that have been used are set forth in Table III, below:

TABLE III

|  | Plastisol No. | | | | | | | | |
| --- | --- | --- | --- | --- | --- | --- | --- | --- | --- |
|  | 2 | 3 | 4 | 5 | 6 | 7 | 8 | 9 | 10 |
| Vinyl resin | [1] 100 | [1] 100 | [1] 100 | [1] 100 | [1] 100 | [2] 100 | [1] 100 | [1] 100 | [1] 100 |
| Dibutyl sebacate | 25 |  |  |  |  | 50 | 50 |  | 25 |
| Dioctyl adipate |  | 50 |  |  |  |  |  |  |  |
| Diisooctyl adipate |  |  |  | 50 |  |  |  |  |  |
| Diisodecyl adipate |  |  | 50 |  |  |  |  |  |  |
| Diisobutyl adipate |  |  |  |  | 50 |  |  |  |  |
| Di-n-hexyl azelate |  |  |  |  |  |  |  | 50 |  |
| Expoxidized soybean oil | 190 | 165 | 165 | 165 | 165 | 165 | 165 | 165 |  |
| Expoxidized linseed oil |  |  |  |  |  |  |  |  | 102 |
| Barium sulfate | 300 | 300 | 300 | 300 | 300 | 300 |  | 300 | 100 |
| Calcium carbonate |  |  |  |  |  |  | 195 |  |  |

[1] The vinyl chloride-vinyl chloride vinylidene chloride copolymer blend of Example 1 was used.
[2] The vinyl resin was a blend of 60 and 40 parts, respectively, of the vinyl chloride resin and of the vinyl chloride-vinylidene chloride copolymer of Example 1.
N.b.: The formulation of Plastisol No. 7 has also been made with different vinyl resin, e.g., by blending, respectively, 60 parts of the vinyl chloride resin of Example 1 and of a commercially available medium molecular weight polyvinyl chloride paste resin with 40 parts of a vinyl chloride-vinyl acetate copolymer, by blending the paste resin with the copolymer of Example 1, and by blending 40 parts of various other commercially available vinyl copolymer resins with 60 parts of the paste resin and with the vinyl chloride resin of Example 1.

As has been indicated above, whenever dibutyl sebacate is replaced by another sebacate plasticizer or by an adipate or azelate plasticizer, there is some sacrifice in quality of the plastisol gasket composition. This sacrifice may involve one or more of the following: (1) an increase in viscosity of the composition, which increases the difficulty of gasket formation, (2) the imparting of a slight odor to the composition, when in the form of a gasket, or (3) the imparting of a slight taste to foods which come into contact with the final gasket. These phenomena are sufficiently slight that the other plasticizers can be used with acceptable results which are unexpected and unobvious at the high filler levels used in compositions according to the instant invention, and by comparison with previously known plastisol compositions. However, such compositions containing dibutyl sebacate, in the indicated proportions, are unexpectedly useful and unobvious even by comparison with those containing the other sebacates and the adipates and azelates contemplated hereby. Examples of other sebacate, adipate and azelate plasticizers which can be used in the foregoing formulations include dibutyl adipate, di-n-hexyl adipate, dicapryl adipate, di-(2-ethylhexyl) adipate, dinonyl adipate, octyl decyl adipates, di-decyl adipates, di(methylcyclohexyl) adipate, di-2-ethylbutyl azelate, di-2-ethylhexyl azelate, di-isooctyl azelate, di-isobutyl azelate, dioctyl sebacate, di-isooctyl sebacate, di-2-ethylhexyl iso-sebacate and mixed alcohol sebacates where the mixed alcohols have an average of from 4 to 8 carbon atoms. Mixtures of the plasticizers can also be employed.

It will be apparent that various changes and modifications can be made from the specific details set forth herein without departing from the spirit and scope of the invention as set forth in the appended claims.

What I claim is:

1. A gasket-forming composition adapted for use with a metal closure, said composition comprising a plastisol mixture of:
   (A) about 215 parts of a plasticizer composition,
      (a) said plasticizer composition consisting essentially of about 50 parts of dibutyl sebacate and about 165 parts of an epoxidized soybean oil having an iodine number not greater than 6, and an oxirane oxygen content of at least 6 percent,
   (B) 100 parts of a vinyl chloride polymer dispersed in the plasticizer composition, and
   (C) about 300 parts of a barium sulfate filler.

2. A gasket-forming composition adapted for use with a metal closure, said composition comprising a plastisol mixture of:
   (A) from 190 to 240 parts of a plasticizer composition,
      (a) said plasticizer composition consisting essentially of from 40 to 60 parts of a dialkyl sebacate and from 150 to 180 parts of an epoxidized unsaturated natural oil having an iodine number not greater than 6, and an oxirane oxygen content of at least 6 percent,
   (B) 100 parts of a vinyl chloride polymer dispersed in the plasticizer composition, and
   (C) from 275 to 325 parts of a barium sulfate filler.

3. A gasket-forming composition adapted for use with a metal closure, said composition comprising a plastisol mixture of:
   (A) from 190 to 240 parts of a plasticizer composition,
      (a) said plasticizer composition consisting essentially of from 40 to 60 parts of a dialkyl sebacate and from 150 to 180 parts of an epoxidized unsaturated natural oil,
   (B) 100 parts of a vinyl chloride polymer dispersed in the plasticizer composition, and
   (C) an amount of a filler selected from the group consisting of calcium carbonate and barium sulfate which is equivalent on a volume basis to from 275 to 325 parts of barium sulfate.

4. A gasket-forming composition adapted for use with a metal closure, said composition comprising a plastisol mixture of:
   (A) from 125 to 300 parts of a plasticizer composition,
      (a) said plasticizer composition consisting essentially of from 25 to 100 parts of at least one plasticizer selected from the group consisting of diesters of sebacic acid with $C_4$ to $C_8$ alkyl alcohols diesters of azelaic acid with $C_4$ to $C_8$ alkyl alcohols, and diesters of adipic acid with $C_4$ to $C_{16}$ alkyl alcohols and from 100 to 200 parts of an epoxidized unsaturated natural oil having an iodine number not greater than 6, and an oxirane oxygen content of at least 6 percent,
   (B) 100 parts of a vinyl chloride polymer dispersed in the plasticizer composition, and
   (C) an amount of a filler selected from the group consisting of calcium carbonate and barium sulfate which is equivalent on a volume basis to from 150 to 450 parts of barium sulfate.

5. A gasket-forming composition adapted for use with a metal closure, said composition comprising a plastisol mixture of:
   (A) from 125 to 300 parts of a plasticizer composition,
      (a) said plasticizer composition consisting essentially of from 25 to 100 parts of an alkyl diester of an acid selected from the group consisting of sebacic acid, adipic acid and azelaic acid, and from 100 to 200 parts of an epoxidized unsaturated natural oil.
   (B) 100 parts of a vinyl chloride polymer dispersed in the plasticizer composition, and
   (C) an amount of filler selected from the group consisting of calcium carbonate and barium sulfate which is equivalent on a volume basis to from 150 to 450 parts of barium sulfate.

6. A gasket-forming composition adapted for use with a metal closure, said composition comprising a plastisol mixture of:
   (A) from 125 to 300 parts of a plasticizer composition,
      (a) said plasticizer composition consisting essentially of from 25 to 100 parts of an alkyl diester of an alkyl dibasic acid and from 100 to 200 parts of an epoxidized unsaturated natural oil,
   (B) 100 parts of a vinyl chloride polymer dispersed in the plasticizer composition, and
   (C) an amount of a filler selected from the group consisting of calcium carbonate and barium sulfate which is equivalent on a volume basis to from 150 to 450 parts of barium sulfate.

7. A metal closure having a sealing gasket produced by hardening the plastisol mixture claimed in claim 6.

References Cited

UNITED STATES PATENTS

| | | | |
|---|---|---|---|
| 2,654,913 | 10/1953 | Maier | 260—23 X |
| 2,880,901 | 4/1959 | Zipper | 215—40 |
| 2,967,162 | 1/1961 | Vasta | 260—21 |
| 2,980,643 | 4/1961 | Edelman et al. | 260—23 X |
| 2,993,920 | 7/1961 | Budde et al. | 260—23 |
| 3,002,641 | 10/1961 | Normandy | 215—40 |
| 3,005,433 | 10/1961 | Risch | 215—40 |
| 3,061,130 | 10/1962 | Husum | 260—23 X |
| 3,202,307 | 8/1965 | Rainer et al. | 260—23 |
| 3,231,529 | 1/1966 | Kuhn et al. | 260—23 X |
| 3,283,936 | 11/1966 | Kehe et al. | 215—40 |

DONALD E. CZAJA, *Primary Examiner.*

LEON J. BERCOVITZ, *Examiner.*

R. A. WHITE, *Assistant Examiner.*